May 20, 1930.    N. L. DERBY    1,759,043
STORAGE BATTERY TERMINAL CONNECTION
Filed July 20, 1927
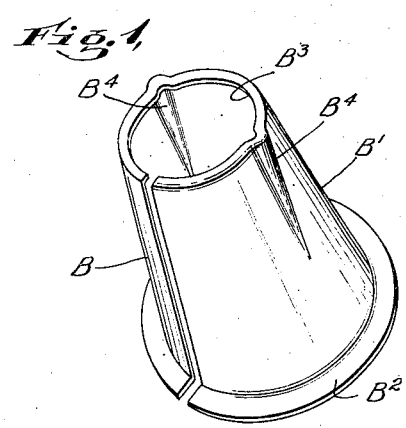
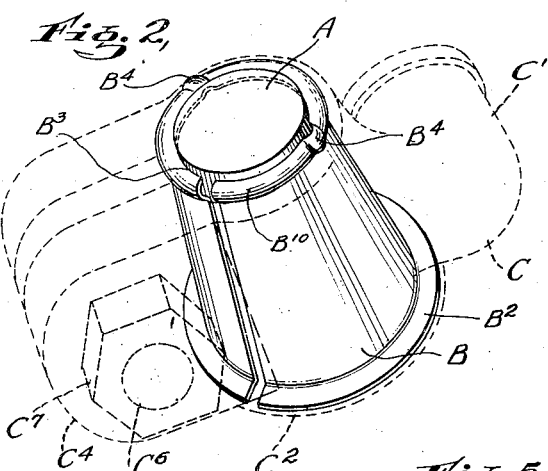
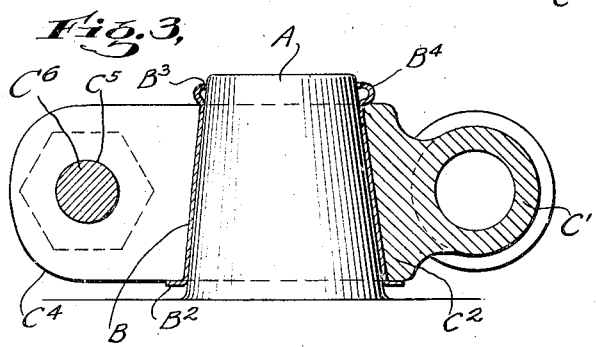
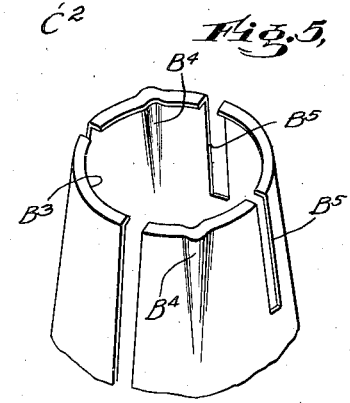
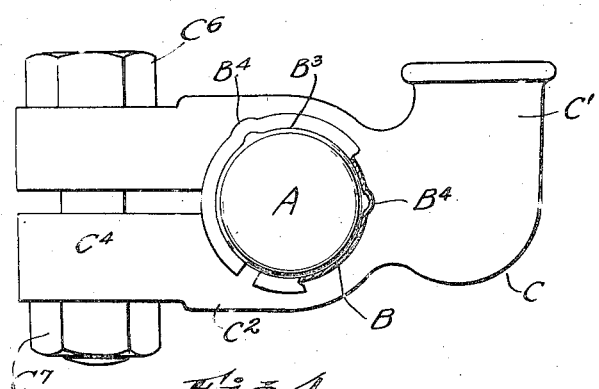
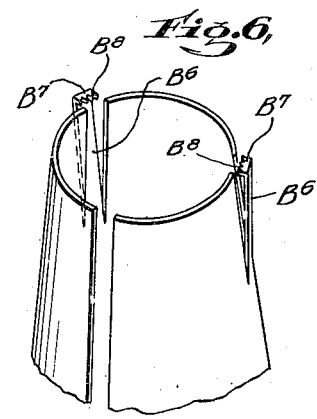
INVENTOR
NORMAN L. DERBY
BY
John E. Hubbell
ATTORNEY Patented May 20, 1930

1,759,043

UNITED STATES PATENT OFFICE

NORMAN L. DERBY, OF LONG ISLAND CITY, NEW YORK, ASSIGNOR TO STANLEY R. ROOT, OF PHILADELPHIA, PENNSYLVANIA

STORAGE-BATTERY TERMINAL CONNECTION

Application filed July 20, 1927. Serial No. 207,063.

The present invention relates to storage battery terminal post connections of the type wherein a clamp member, to which an electric current conductor is secured, is clamped on each of the terminal posts of the battery.

The object of my present invention is to provide an improved means for maintaining a tight fit between the clamp member and terminal post on which it is mounted and for locking the clamp member in position on said post. More specifically, the object of my invention is to provide an improved construction of a sleeve shim or bushing which is particularly adapted for use on storage battery terminal posts.

The sleeve shim of the present invention comprises improvements over the sleeve shim shown in my prior application Serial No. 178,372, filed March 25, 1927, and certain features of construction disclosed herein but not claimed, are shown and claimed in that application.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:—

Fig. 1 is a perspective view of a preferred embodiment of the sleeve shim of my invention;

Fig. 2 is a perspective view of the sleeve shim arranged on a storage battery terminal post with the locking arrangement magnified to illustrate the action taking place when the clamp member is tightened in position on the shim;

Fig. 3 is an elevation partly in section of the various members in position;

Fig. 4 is a plan view of the arrangement shown in Fig. 3 with a portion of the upper flange broken away;

Fig. 5 is a perspective view of a modified form of the sleeve shim; and

Fig. 6 is a perspective view of a second modification.

In the drawings, and particularly in Figs. 1 to 4, I have illustrated a preferred embodiment of my invention wherein a storage battery terminal post A is arranged with a sleeve shim or bushing B thereon for the purpose of providing a tight fit and preventing relative movement between a clamp member C and the terminal post.

The storage battery terminal post A is in the form of a frustum of a cone and made of either lead or lead alloy or metal coated with a second acid resisting metal to prevent decomposition of the post when any of the electrolyte in the battery comes in contact therewith. In Figs. 2 to 4 is shown the clamp member C, which comprises a connector holding socket C' projecting from one side of a substantially circular body portion $C^2$. The body portion $C^2$ is provided with a tapered post hole $C^3$ through the central portion thereof. On the side opposite the socket C', the body portion is formed with a pair of projecting tongue members $C^4$ having their inner adjacent sides spaced apart and provided with aligned openings $C^5$ through which a bolt $C^6$ is passed. A nut $C^7$ is threaded on the outer end of the bolt for adjusting the fit of the clamp member C on the terminal post.

As disclosed in my prior application, it has been found advantageous to provide a sleeve shim or bushing B between the connector clamp and the terminal post to provide a tight fit between the clamp and post members, as the connection between the clamp and post becomes loose due to the constant wear between the parts due to the vibrations of the body in which the storage battery is carried. The diameter of the terminal post is often further reduced by the pressure of the clamp on the soft metal of the post. The clamp tongue members $C^4$ are generally not sufficiently resilient to compensate for all of the reduction in diameter.

In the present application, I have provided an improved form of sleeve shim, which is made of resilient sheet metal of high conducting characteristics, such as brass or aluminum, and comprises a tapered body portion B', having a flange B², projecting outwardly from the base thereof and a flange B³, propecting inwardly at the top thereof. The sleeve shim B is slotted down one side to provide a more resilient construction, so that the shim may be used on various sized terminal posts. For the usual size terminal post, I make the lower flange B² of the shim approximately 1/16" wide and the upper flange B³ between .005" and .010" in width.

The sleeve shim is further provided with one or more lugs or ribs B⁴ integrally formed in the body portion B', and extending from a point about the middle of the body portion to the top thereof. Each rib is inclined outwardly and laterally as it approaches the top of the body portion, as shown in Fig 1.

In Figs. 2 to 4, I have illustrated the arrangement of the clamp and sleeve shim on the terminal post, and in Fig. 2 the form which the sleeve shim takes after the parts are placed in the locking position.

In the intended mode of using my invention, the shim is placed in the central opening of the clamp with the lower flange B² of the shim contacting with the lower face of the clamp member. The bolt and nut connection being loosened, the clamp and shim are mounted on the terminal post and forced downwardly until the flange B³ is below the top of the terminal post. The bolt and nut connection is then adjusted to tighten the body portion of the clamp on the post.

As illustrated in Fig. 2, when the clamp member is tightened, the inner edge of the upper flange B³ of the shim is forced into the relatively soft metal of the terminal post to lock the shim in position thereon. At the same time the tightening of the clamp member flattens the portion of the locking ribs B⁴ in contact therewith and due to the flange B² being held perpendicular to the post, the portion of the shim adjacent the upper flange B³ is bulged outwardly over the top surface of the clamp member, thereby forming an annular projecting flange B¹⁰, which presses downwardly on the top of the clamp member.

As shown in Figs. 2 and 3, the upper end of each rib B⁴ is forced outwardly a slightly greater distance than the remaining portion of the top edge portion and forms a locking lug which with the flange B¹⁰ prevents any upward movement of the clamp. With this construction the sleeve shim is held in a fixed position on the terminal post and the clamp member mounted in close engagement with the terminal post and held between the lower flange B² and the annular portion B¹⁰. The lower portion of the ribs after being flattened by the clamp member is slightly rough and with the sharp edges of the shim adjacent the slots acts to prevent any rotation of the clamp on the post. The connection can be removed by loosening the nut C⁷, thereby relieving the pressure of the clamp on the shim. The resilient construction of the shim then permits the clamp to be removed by forcing the clamp up over the shim projecting portions.

My invention is characterized by the simplicity and effectiveness of the locking or holding provisions and the ease in which the parts may be assembled. With the method disclosed in my prior application, the sleeve shim can be easily and cheaply manufactured in quantity. The resilient construction of the shim permits the removal and re-use without affecting the effectiveness of the arrangement.

In Fig. 5 I have illustrated a modified form of the sleeve shim of my invention wherein a flange B³ and ribs B⁴, similar to those heretofore disclosed, are formed in the body of the shim. In addition one or more rectangular slots B⁵ are cut in an upper portion of the shim. In the form illustrated, three slots are shown extending downwardly from the top at spaced points about the circumference. The slot construction is especially advantageous in that the upper edge portion of the shim is more free to bulge outwardly under the pressure of the clamp member than is the construction shown in Figs. 1-4.

In the modification illustrated in Fig. 6, the upper portion of the sleeve shim is not provided with an inwardly turned flange such as shown heretofore, but is constructed with one or more rectangular prong members B⁶, each of which is integrally connected at its lower end to the body portion and provided with an inwardly projecting flange B⁷ at the upper end thereof. The inner side of the flange B⁷ is formed with one or more teeth B⁸ to more effectively bite into the surface of the terminal post. This mode of construction performs the function of both the flange B³ and the projecting ribs B⁴ of the constructions described heretofore.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:—

1. The combination with a storage battery terminal post, of a clamp member mounted on said post and means for holding said clamp member in a predetermined position relative to said post comprising a sleeve member having an inwardly projecting flange at the top thereof and a vertical rib integrally formed in said sleeve projecting outwardly from one side thereof.

2. The combination with a storage battery terminal post, of a clamp member mounted on said post and means for holding said clamp member in a predetermined position relative to said post comprising a resilient sleeve member mounted on said post and having an inwardly projecting flange at the top thereof, and means for adjusting said clamp member to force said flange into the surface of said post.

3. The combination with a storage battery terminal post, of a clamp member mounted on said post having means for tightening said clamp member in position, and means for holding said clamp member in a predetermined position relative to said post comprising a sleeve mounted on said post having an inwardly projecting flange at the top thereof and a vertical rib projecting outwardly from one side of said sleeve, the upper portion of said rib being arranged to be bulged outwardly when said clamp member is tightened in position.

4. The combination with a storage battery terminal post, of a clamp member mounted on said post, and means for holding said clamp member in a predetermined position on said post comprising a sleeve shim mounted on said post having an inwardly projecting flange at the top thereof and a vertical rib integrally formed along the upper portion of one side thereof, the upper portion of said shim adjacent said flange and rib arranged to bulge outwardly when said clamp member is tightened in position on said post.

5. A sleeve shim comprising a resilient body portion having an inwardly projecting flange at one end and an outwardly projecting flange at the opposite end.

6. A sleeve shim comprising a resilient body portion having an inwardly projecting flange at one end and a projecting rib integrally formed in said body portion adjacent said flange.

7. A sleeve shim comprising a resilient body portion having an inwardly projecting flange at one end and an outwardly shaped rib integrally formed in said body portion adjacent said flange.

8. A sleeve shim comprising a resilient body portion having an inwardly projecting flange at one end, a projecting rib extending longitudinally of and integrally formed in said body portion and a longitudinally extending slot in said body portion adjacent said flange.

9. The combination with a storage battery terminal post, of a clamp member mounted on said post and means for holding said clamp member in a predetermined position relative to said post comprising a metallic sleeve member between said post and clamp member, said sleeve member having a rib integrally formed therein and extending longitudinally thereof and projecting outwardly from one side thereof, the upper portion of said rib being arranged to overlap said clamp member when the latter is tightened on said post.

10. The combination with a storage battery terminal post, of a clamp member mounted on said post, means for holding said clamp member in a predetermined position relative to said post comprising a sleeve member of resilient metal having a rib integrally formed in and extending longitudinally thereof and a flange projecting outwardly at one end thereof and means for tightening said clamp member on said sleeve whereby the lower portion of said rib is compressed and the clamp is held between the upper portion of said rib and said flange.

11. A shim comprising a tubular body portion of thin metal and an integral rib extending longitudinally of and projecting from one side of said body portion.

12. A sleeve shim comprising a resilient body portion having an outwardly projecting flange adjacent one end thereof and a projecting rib extending longitudinally of said body portion adjacent the opposite end thereof.

Signed at New York city, in the county of New York, and State of New York, this 19th day of July, A. D. 1927.

NORMAN L. DERBY.